June 12, 1934.   S. N. GOODHALL ET AL   1,962,865
APPARATUS FOR STRINGING TENNIS AND OTHER RACKETS
Filed Nov. 11, 1930   12 Sheets-Sheet 1

INVENTORS
SYDNEY NEVILLE GOODHALL
GEOFFREY CHARLES BRENTNALL
BY
ATTORNEYS

June 12, 1934.  S. N. GOODHALL ET AL  1,962,865
APPARATUS FOR STRINGING TENNIS AND OTHER RACKETS
Filed Nov. 11, 1930  12 Sheets-Sheet 10

INVENTORS
SYDNEY NEVILLE GOODHALL
GEOFFREY CHARLES BRENTNALL
ATTORNEYS

June 12, 1934.   S. N. GOODHALL ET AL   1,962,865
APPARATUS FOR STRINGING TENNIS AND OTHER RACKETS
Filed Nov. 11, 1930   12 Sheets-Sheet 12

INVENTORS
SYDNEY NEVILLE GOODHALL
GEOFFREY CHARLES BRENTNALL
BY
ATTORNEYS

Patented June 12, 1934

1,962,865

UNITED STATES PATENT OFFICE 1,962,865

APPARATUS FOR STRINGING TENNIS AND OTHER RACKETS

Sydney Neville Goodhall, Marston Green, and Geoffrey Charles Brentnall, Erdington, Birmingham, England, assignors to Dunlop Rubber Company Limited, Erdington, Birmingham, England, a British corporation Application November 11, 1930, Serial No. 494,868
In Great Britain November 21, 1929

12 Claims. (Cl. 273—73)

This invention relates to apparatus for stringing lawn tennis and like rackets, the objects of the invention including the provision of means whereby the correct tension is automatically applied to each string without being exceeded, the application of the load being made by mechanical means devised so as not only to automatically prevent the string being broken by any neglect on the part of the operative but permitting a power drive to be substituted for human energy with the same advantage of freedom from dependence upon the operative's watchfulness for stopping the mechanism before movement of the loading parts is carried to a point at which breakage of the string is inevitable.

Further objects of the invention consist in improvements in the mechanism for gripping and for holding the strings while they are being tensioned.

According to this invention, we provide apparatus for stringing tennis and like rackets having load applying means for tensioning the strings such that the string tensioning means ceases under automatic control to increase the string tension beyond a predetermined value, and in which the attainment of the required string tension automatically operates to prevent an increase of tension, preferably by utilizing a control mechanism in conjunction with the parts of a differential gear, one part of which may be restrained from rotation by a known force, and another adapted to actuate a further movement whereby the tension is limited to the required value independent of the drive to the differential gear, which may be driven by any suitable power supply.

In order that our invention may be more easily understood and readily carried into effect, the same will now be described with reference to the accompanying drawings, in which:—

Fig. 19 is an elevation from the left end of Fig. 18a.

The invention comprises a suitable frame which carries a pair of parallel horizontal shafts 1, 2, which are hereinafter termed "gripper shafts" and between which in the middle and parallel to them, the tennis racket, not shown, is fixed in some suitable manner on a horizontal platform 3, as for instance by means of four clamping devices 4 distributed around the frame of the racket. A further clamping device 5 after the manner of a vise serves to grip the handle of the racket. These clamping devices will be described in greater detail below.

Figure 1:
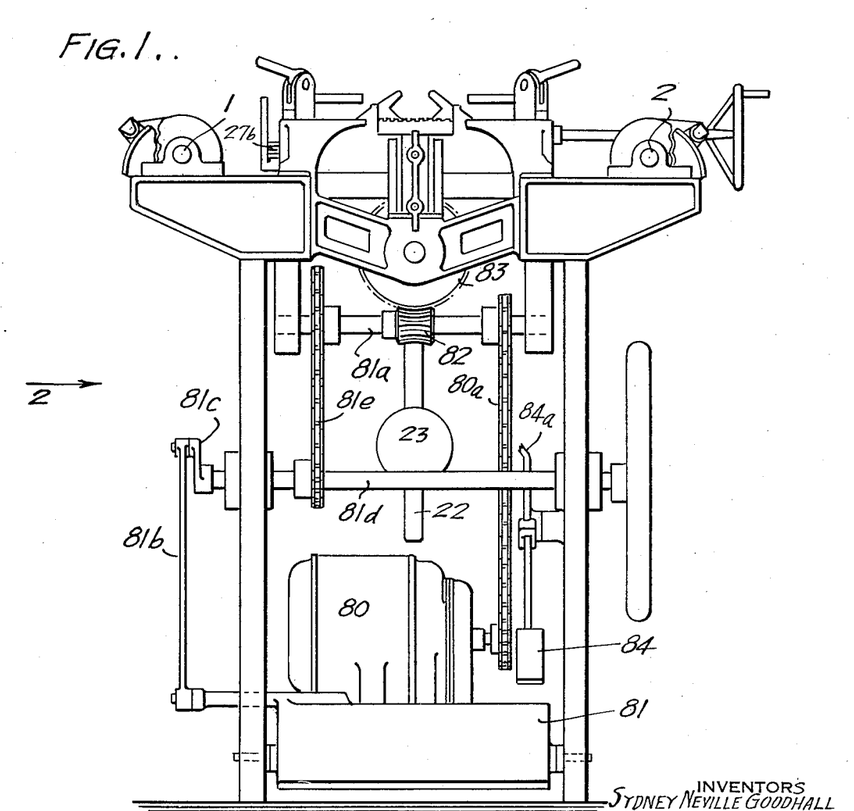
Fig. 1 is a front elevation of one embodiment of the invention.
Figure 2:
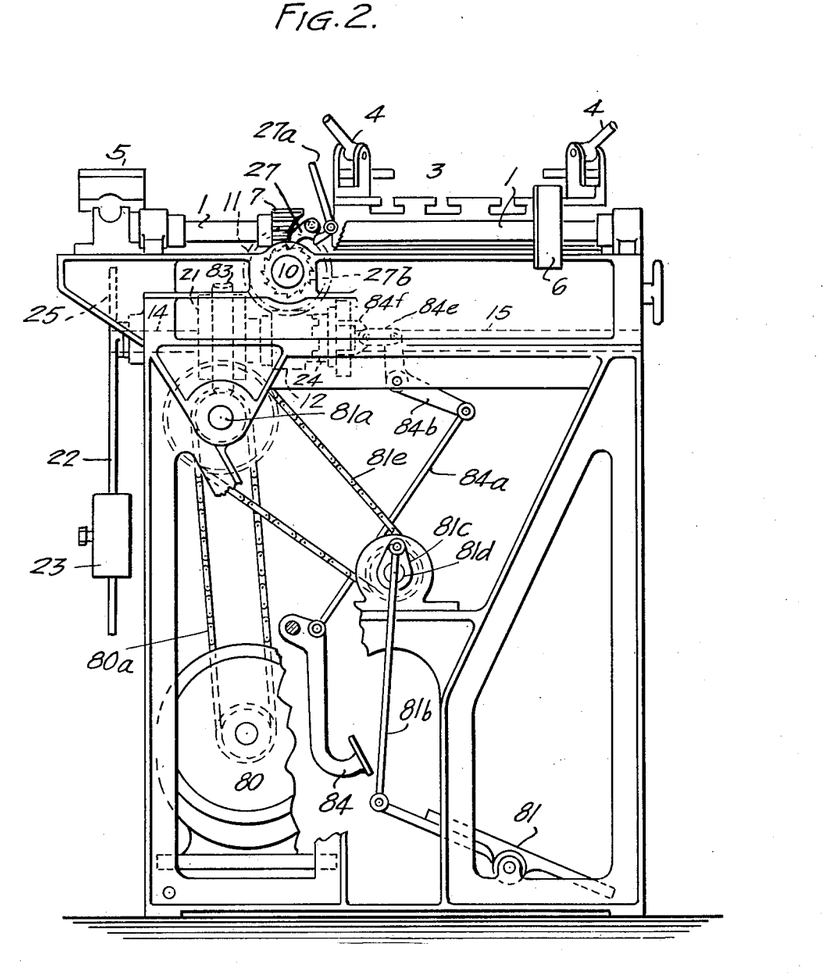
Fig. 2 is an elevation from the left side of Fig. 1.

As shown in Figs. 1 and 2, the power drive may be effected either from a motor 80 through chain 80a to a counter-shaft 81a or through a foot treadle 81 and link 81b, crank 81c, shaft 81d and chain 81e to said counter-shaft 81a.

The gripper shafts 1 and 2 each bear a so-called string gripper 6 which grasps the free end of the strings. The string is tensioned by the rotation of the said string gripper 6 with its gripper shaft 1 or 2, respectively. This string gripper and its mode of operation will also be described in detail later on.

Figure 1A:
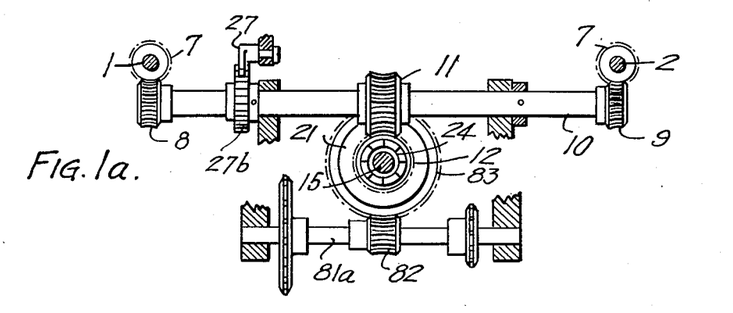
Fig. 1a is a skeleton view showing parts hidden from view in Fig. 1.
Figure 3:
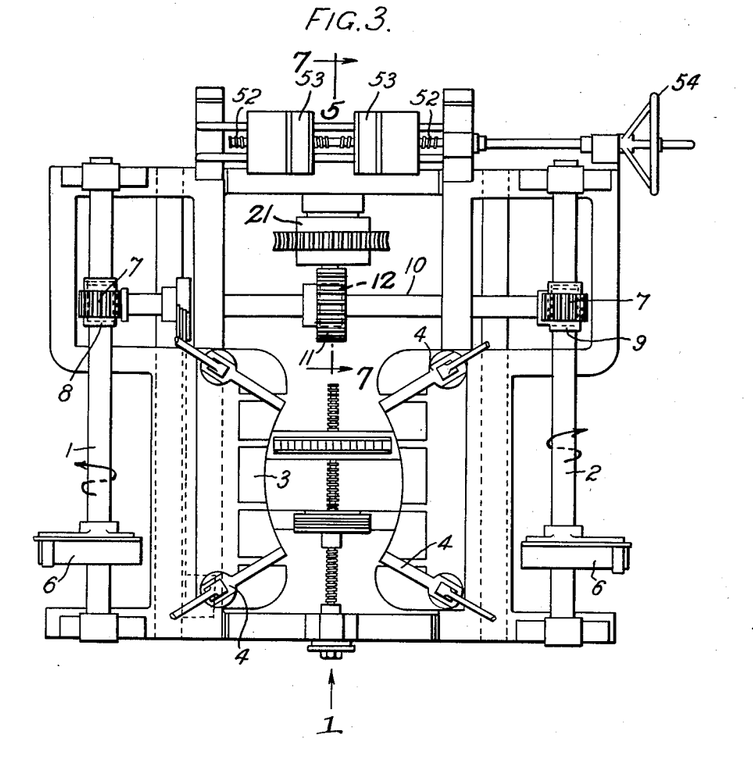
Fig. 3 is a plan of Fig. 1.

Each of the two gripper shafts 1, 2, carries in Figs. 1a, 2 and 3, a worm wheel 7 in which worms 8 and 9, respectively, mesh. (In Figs. 4, 5 and 6 bevel wheels 77 replace the worm and worm wheels.) These two worms 8 and 9 are carried, respectively, at the left and right ends of a shaft 10, which is hereinafter termed "the intermediate shaft", as shown in Fig. 3. This intermediate shaft 10 extends underneath the said gripper shafts 1, 2 and at right angles thereto. Arranged on the intermediate shaft 10 in the middle, there is a worm wheel 11, Fig. 1a, in which a worm 12, Fig. 7, engages. This worm 12 is carried by a shaft 15, which is one of two coaxial shafts 14 and 15 of the differential gear above mentioned, and through which the various other shafts receive their movement in order to bring about the desired string tension. The differential shaft 15 lies parallel to the gripper shafts 1, 2, in a lower plane.

Figures 7, 7B, 7C:
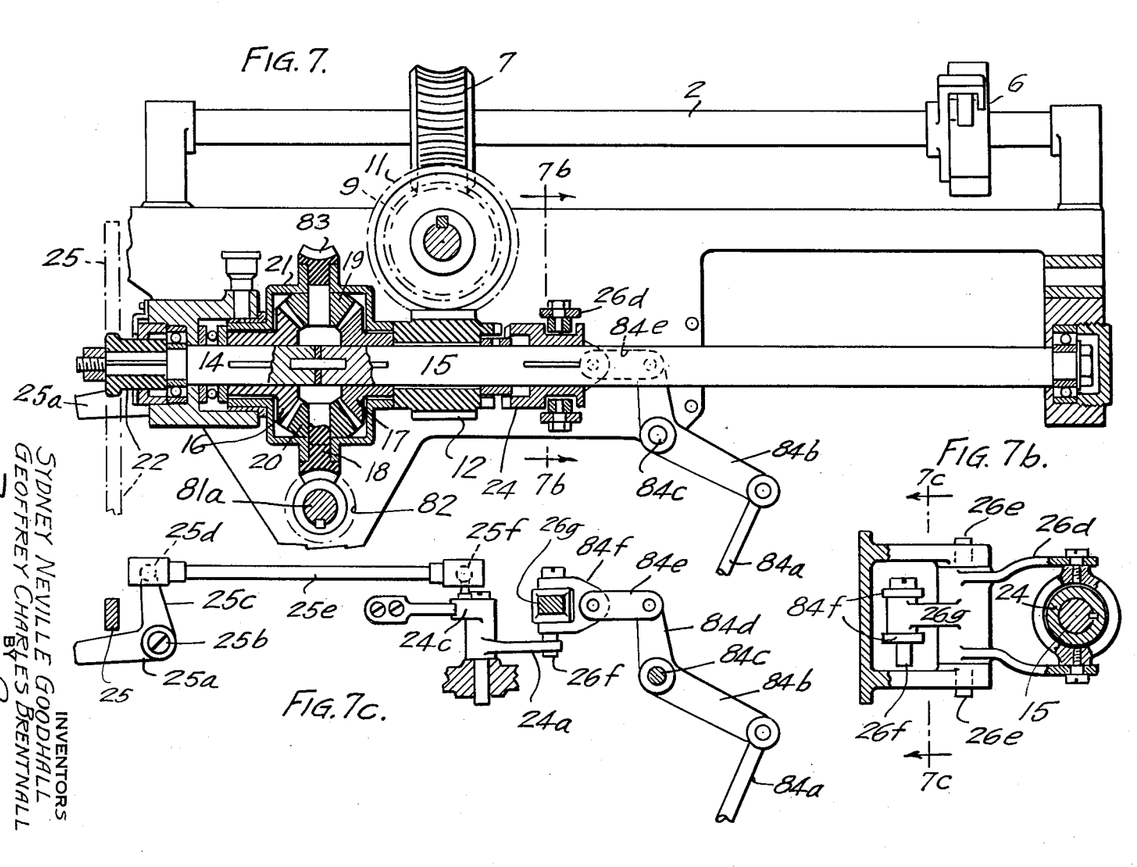
Fig. 7 is a longitudinal section on line 7—7 of Fig. 3, showing the differential gear and related parts.
Fig. 7b is a section on line 7b—7b of Fig. 7.
Fig. 7c is a skeleton detail view projected from Figs. 7 and 7b.

The differential gear Fig. 7 may be more or less orthodox, and consist of the pair of coaxial shafts 14, 15, as well as two bevel wheels 16, 17, of which 16 is keyed to the shaft 14, and 17 to the shaft 15. There is also a pinion ring 18, which revolves on the said shafts 14, 15, and carries a pair of bevelled planet wheels 19, 20, which mesh with the said main bevel wheels 16, 17. The pinion ring 18 is set into rotation by a cage or housing 21, which in turn is revolved by a suitable drive, for instance the motor 80 or treadle 81 and countershaft 81a through a worm 82 and worm wheel 83 about the axis of the differential shafts 14, 15.

One of the two said shafts, hereinafter termed "the counter-tensioning shaft" 14, is restrained by a known force as for instance by the weight 23, which may be previously set, whilst the other shaft hereinafter termed "the tensioning shaft" 15, serves as a driving means for the intermediate shaft 10 in the manner already stated.

Figures 7A, 8, 8A:
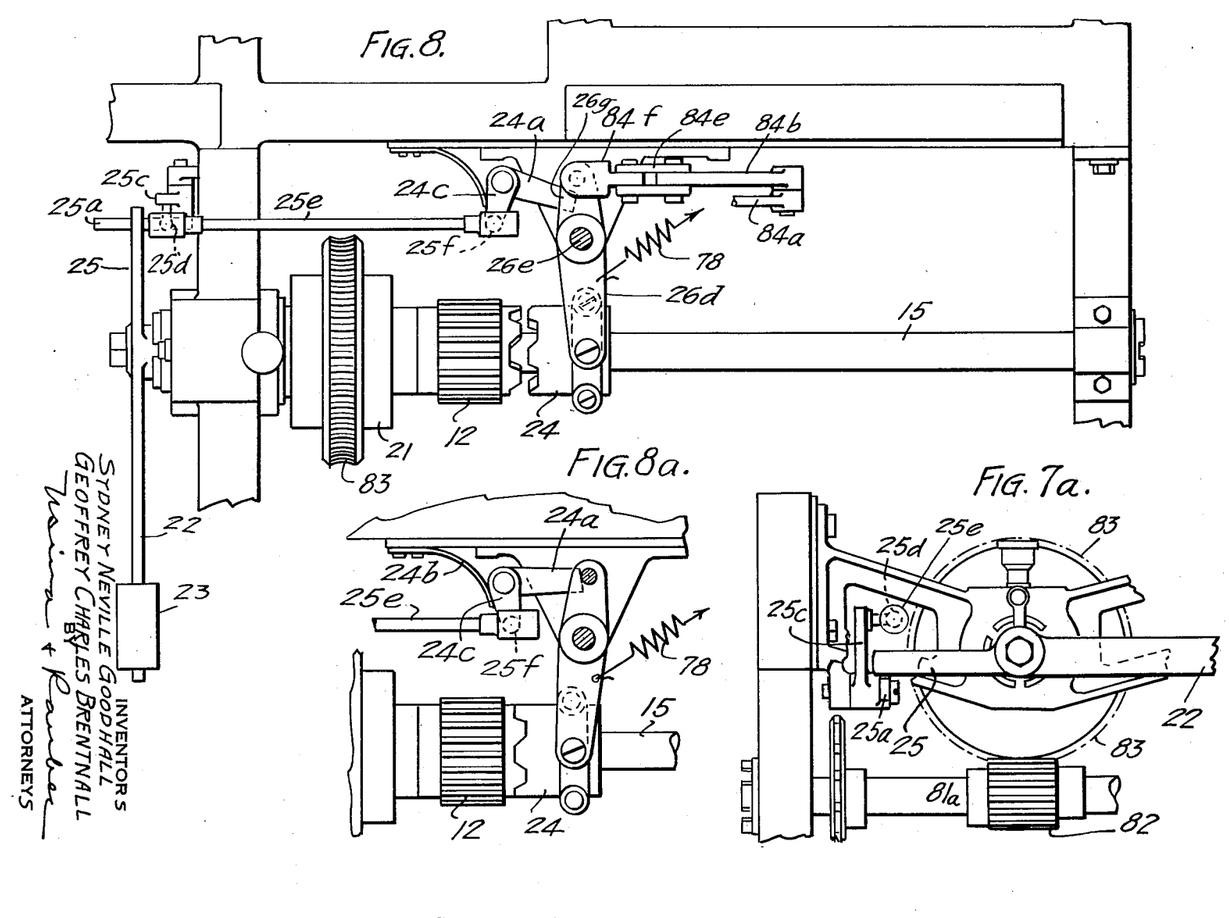
Fig. 7a is an elevation from the left end of Fig. 7.
Fig. 8 is a plan of the differential gear of Fig. 7, the counter-tension weight being shown in clutch tripping position.
Fig. 8a is a detail illustrating the latch means holding the clutch in engaged position.

The counter-tensioning shaft 14 is provided at its free end with a lever 22, Fig. 7a, on which the adjustable weight 23, Fig. 2, is arranged. This enables the tensioning force to be varied. The particular position of the weight 23 on the lever 22, i. e. its radial distance from the counter-tensioning shaft 14 forming the pivot, determines the amount of tension to which the string is subjected. The string tension is, therefore, always a constant function of the weight 23 and its particular position, i. e., the turning moment of the weight.

In the embodiment described hitherto, the drive to the differential gear may continue uninterruptedly, and in order to rotate the string grippers 6 the drive to the shaft 10 is effected through the shaft 14, 15 by means of a coupling or clutch member 24, Figs. 7 and 8; the worm 12 on the tension shaft 15 runs freely on this shaft and can be coupled with it through the said clutch 24.

An arrangement may be provided whereby the gear reverts automatically to the initial position as soon as the desired string tension is reached. A suitable arrangement for this purpose may take the form of an extension arm 25 extending from the weight lever 22 which, when the weight 23 is lifted, releases a spring-pressed latch 24a through a linkage 26, Fig. 8, consisting of a number of levers and connecting rods, so that the clutch 24 on the tension shaft 15 opens. The clutch 24 may be engaged by actuating the foot pedal 84. Through link 84a (Fig. 2) motion will thus be transmitted to lever 84b which will rock the stub shaft 84c in a clockwise direction (Figs. 7 and 7c) and through arm 84d, links 84e and clevis 84f will rock the clutch operating fork 26d about its pivot 26e and thus shift the clutch 24 to the closed position of Fig. 8a. At this time, the latch 24a will be moved by its spring 24b to the position of Fig. 8a, thus holding the clutch in engagement with the gear 12. The latch 24a is arranged to be automatically tripped when the counter-tension weight 23 reaches a predetermined position and when so tripped, as indicated by the position of parts in Fig. 8, tension spring 78 will, through the fork 26d, disengage the clutch. Means for effecting such disengagement are best shown in Figs. 7a, 7c and 8. When the extension 25 of the weight arm reaches a predetermined position, it will strike the free end of a bell crank 25a which is pivoted at 25b to any suitable fixed support.

The bell crank has an arm 25c connected by a universal ball connector 25d with a link 25e, which in turn is connected by a similar ball connector 25f with an arm 24c depending from the latch 24a. Thus, the end of the latch will be swung out of the path of a suitable latch pin 26f projecting downwardly from the rear arm 26g of the fork 26d.

When the foot pedal is operated to engage the clutch member 24, the weight lever 22 will have returned to its rest position and will thus permit the latch 24a to move to the position of Fig. 8a under the influence of its spring 24b.

The operation of the main portion of the apparatus described above is as follows. The string which is first secured to one side of the racket is passed across the racket through a stringing hole in the other side and thence onto and secured, without undue slackness, to a respective adjacent gripper. The differential casing 21, if not already rotating, is next set into rotation, the restrained side 14, 16 of the differential remains at rest and the opposite tensioning side 15, 17 revolves. Now the clutch 24 is engaged so that the gripper shafts 1 and 2 are driven from the shaft 15.

As soon as the tension of the string is such that the turning moment to be applied at the free (tensioning) main bevel wheel 17 is equal to the counter-tensioning moment derived from a predetermined rise in the weight 23, at the other (restraining) main bevel wheel 16, the bevel wheel 17 must be disconnected from further action on the string. Any further tensioning of the string now ceases automatically because the arm 25 extending from the weighted lever 22 throws the clutch 24 out of operation and thus stops further rotation of both the shaft 10 and the gripper shafts 1, 2. The differential housing now rotates freely and the weighted lever 22 returns substantially to its initial position.

Figure 4:
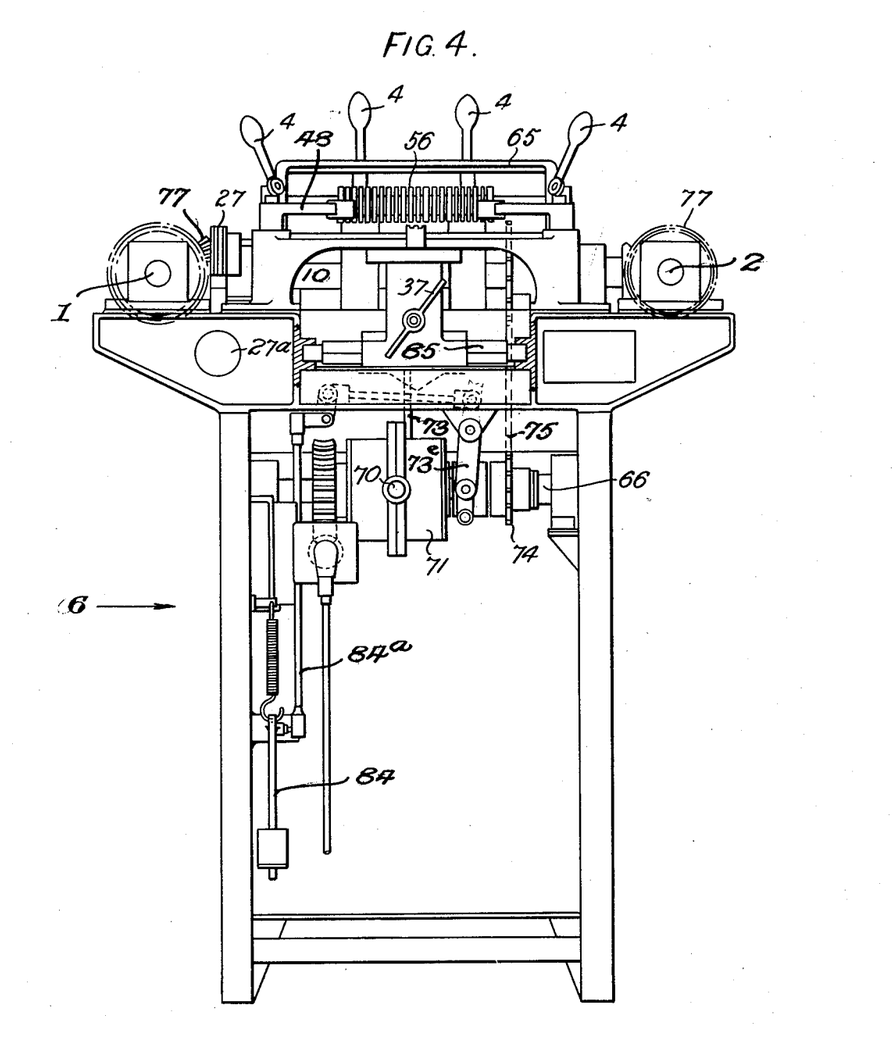
Figs. 4, 5 and 6 show front plan and side elevations of an embodiment differing from the above in some respects.
Figure 5:
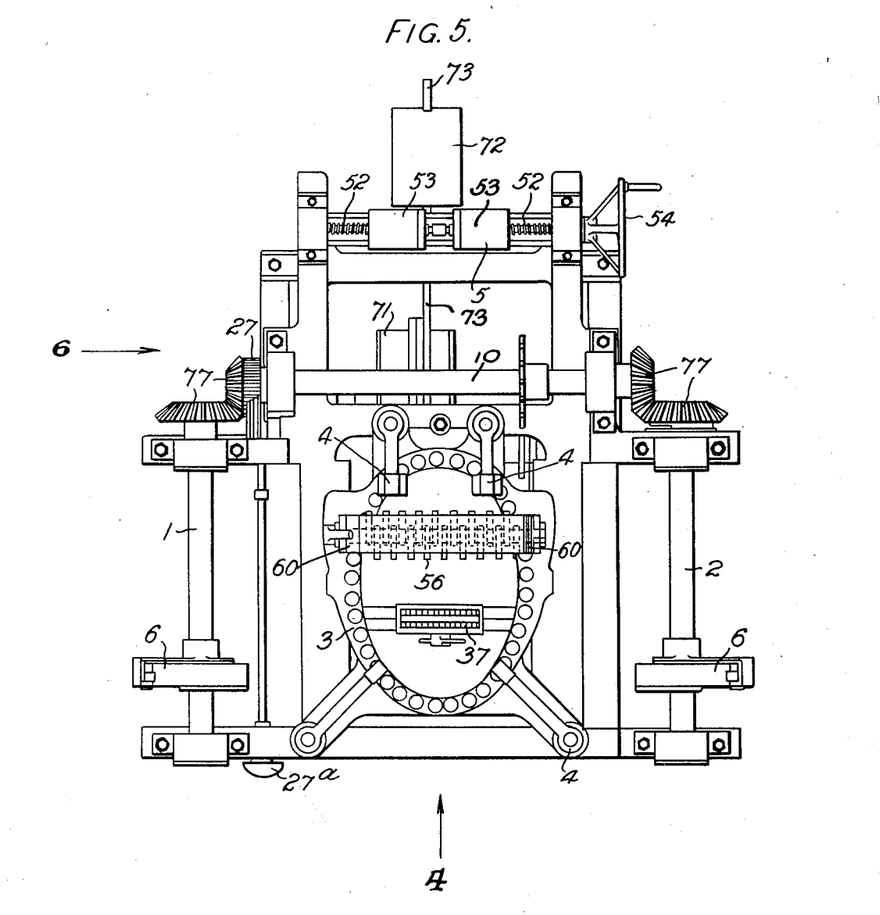

Seeing that owing to the above described arrangement the entire gear returns to the initial neutral, i. e., it ceases to exert any pull on the particular string, this string would momentarily become slack again were not this tendency prevented by an escapement or pawl 27, Figs. 4 and 5, which cooperates with teeth 27b on the intermediate shaft 10 and prevents this shaft rotating in the reverse direction. This escapement may at any time be disengaged, e. g. by the handle 27a, Figs. 1, 2 and 3, or member 27a, Figs. 4, 5, and 6 for operating the handle so that the gripper shafts 1, 2, may again return to their initial position.

A string has now been applied to the racket, one end of the string being secured to one side of the racket and tensioned to the required degree by the gripper and shaft remote from the side fastened to the racket.

To enable the string held by the gripper to be returned across the racket without loss of tension, an auxiliary clamping device 37 is provided within the frame which device is movable up to the inner edge of the frame on each side. The string is then clamped by this device as near as possible to that part of the frame through which it is stretched by the gripper.

The string is then unwound from the gripper, passed back through the racket, and tensioned by the opposite gripper and shaft in a similar manner, the clamp 37 being then disengaged and moved longitudinally and laterally to clamp the new end at the opposite side of the frame.

Prior to unwinding the string from the gripper in order to re-thread the racket but subsequent to clamping the string adjacent the frame, the escapement 27 is released by the member 27a so that the gripper may revert to the initial position preparatory to re-applying the predetermined load, a suspended weight (not shown in the drawings) and connected to either of the shafts 1 or 2, or equivalent means preferably being provided for the purpose of assisting the gripper shafts to return to their initial position if desired. These operations are then repeated till stringing is complete.

Further features of the object of the invention will be described in the following sections.

In the first place, the string grippers 6, Figs. 9, 10 and 11 will be described. In a preferred embodiment, these comprise an eccentric device to effect the clamping action.

Each string gripper 6 preferably comprises a lever 28 which is keyed on the particular gripping shaft 1 or 2 and carries a roller 29 at its free end. It further comprises two clamping jaws 30, 31 of which the main jaw 30 is loosely carried by the shaft 1 or 2, whilst the second jaw 31 is adjustably mounted on a cantilever 32 which is attached to the main jaw. The main clamping jaw 30 is of cylindrical form, whose axis coincides with the axis of the gripper shaft 1 or 2. A segment of this drum is removed, however, and the chord bounding this segment forms the clamping face of the jaw. This clamping face 33 is preferably provided with grooves or corrugations. The second jaw 31 is arranged between the said clamping face 33 and the roller 29 and the clamping face of the second jaw 31 turned towards the main jaw 30 is complementary to the clamping face 33, whilst the side turned towards the roller 29 forms a more or less steep eccentric face 34.

For clamping in, the string is drawn over the cylindrical portion of the main jaw 30 and then downwards between the clamping faces; preferably however, once more upwards and for this purpose a pin 36 is arranged on the cantilever arm 32, the string being placed round this pin, radial pegs 35 being provided if desired. The gripper shaft 1 or 2 with the lever 28 attached to it is now allowed to rotate in such a way that the latter moves along the eccentric face 34 of the second clamping jaw 31, which is thereby clamped upon the string. However, as soon as the clamping force exerted by the eccentric overcomes the backwardly directed tensile force of the string, the entire string gripper 6 is set into movement and rotates forwards with the gripper shaft 1 or 2 owing to the action of the lever 28 and the roller 29.

Now a form of the string clamp 37 will be described more fully with reference to Figs. 12 and 13. This device permits the strings to be clamped in order to maintain the tension in the last string treated, whilst the end so freed is clamped in the succeeding string gripper 6.

Figures 9, 10, 11, 12, 13:
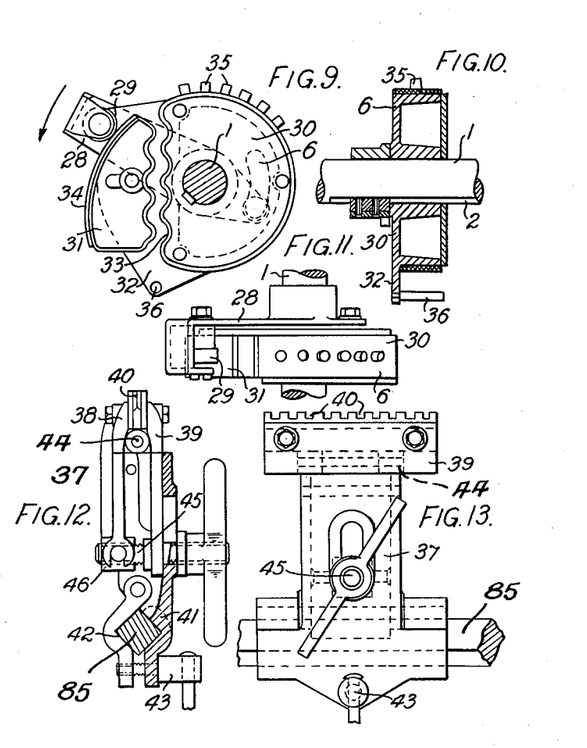
Figs. 9, 10 and 11 show side and front elevations and plan to an enlarged scale of the string gripper 6 of Figs. 1 to 6.
Figs. 12 and 13 show in side and front elevation to an enlarged scale, an embodiment of the string clamp 37 in Figs. 1 to 6.

The string clamp 37, Figs. 12 and 13, consists of a pair of clamping jaws 38, 39, each of which comprises a plurality of oppositely disposed clamping faces. The jaw 39 is extended and has at its base a recess 41 which is companion to a pivoted plate 42 engaged by the clamp 43, the tightening of which serves to hold the gripper upon a squared shaft 85 running transversely of the apparatus, as shown in Fig. 4. The jaws 38 and 39 are retained in pivoted engagement by a fulcrum pin 44 and are both brought together and separated by a screw threaded shaft 45 and a nut 46.

A description will now be given of the clamping devices 4 for the frame of the racket.

These clamping devices consist of a tubular portion 47 (Figs. 14, 15) which is arranged rotatably and at the same time to be vertically adjustable on the frame of the entire apparatus. They further comprise an extending arm 48 which is arranged at the top end of the tubular piece 47 at a right angle and can swing out over the frame of the striking surface of the racket. The clamping is effected by a suitable cam lever mechanism 49, through which the tubular portion 47 is forced downwards by the pressure of the spring 50. A second weaker spring 51 serves normally to force the clamping arm 48 upwards and away from the racket frame.

Figures 14, 15:
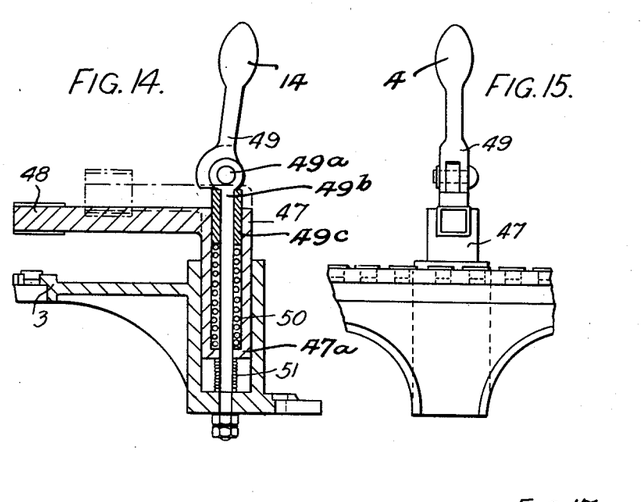
Figs. 14 and 15 show front and side elevations to an enlarged scale of an embodiment of the clamping device 4 in Figs. 1 to 6.

The lever mechanism is pivoted at 49a to an eye bolt 49b carrying a loose collar 49c and the compression spring 50 is restrained between the underside of the collar and the shoulder 47a at the base of the chamber formed in the piece 47, as shown.

The preferred form for the clamping device 5, Figs. 1, 2, 3 and 5, for the racket handle consists of a screwed spindle 52 with a right and left hand thread (see Figs. 3, 5) which acts on a pair of clamping jaws 53 which may be moved towards and away from each other by turning a hand wheel 54.

The following describes the device by means of which the work of threading the transverse strings is made possible when the longitudinal strings are already strung in the racket. This device, Figs. 16 and 17, preferably comprises auxiliary means whereby every second longitudinal string is depressed from its position whilst the remaining longitudinal strings are left unaffected.

Figure 6:
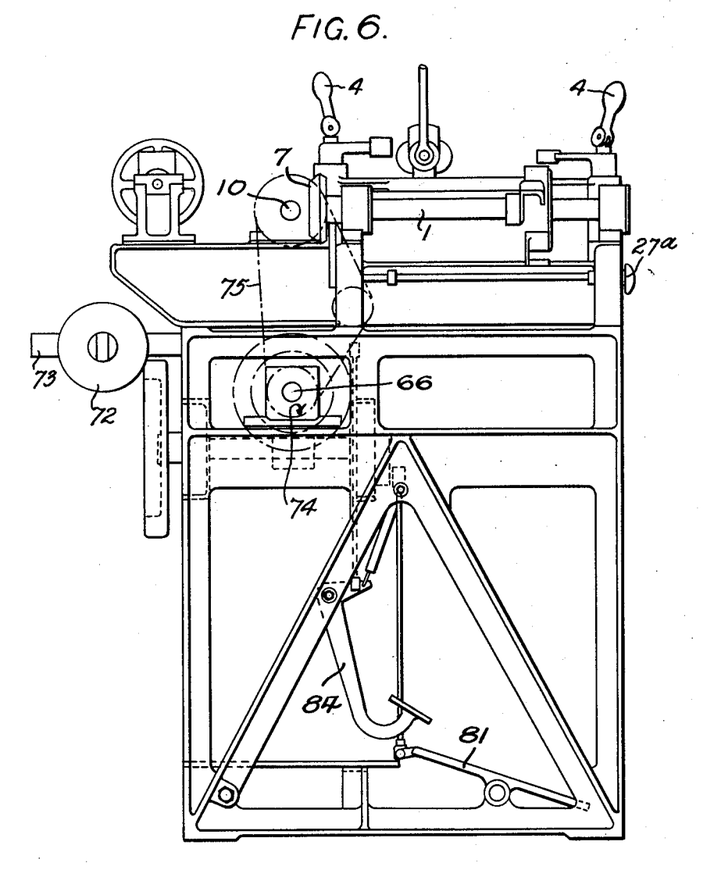
Figures 16, 17:
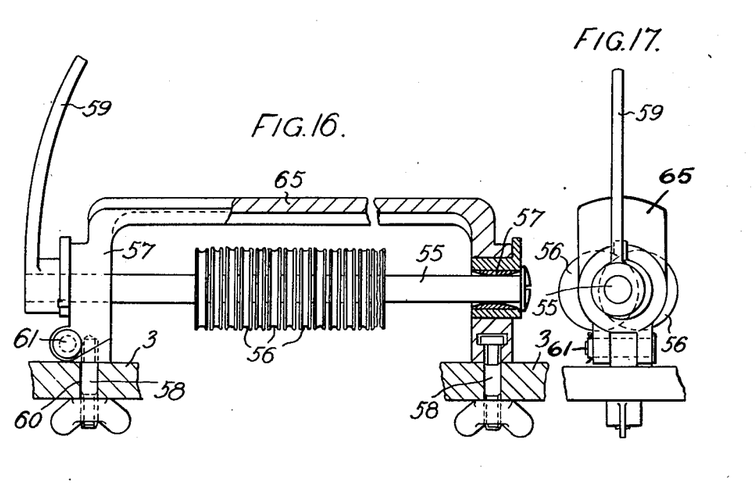
Figs. 16 and 17 show front and side elevations of a modified string separating device according to Figs. 4 and 5.

The means for this purpose are shown in Figs. 4, 5 and 6 and more fully in Figs. 16 and 17, wherein a shaft 55 has fixed to it a plurality of separating members 56, which in this case consist of circular discs arranged eccentrically thereon. They are furthermore arranged alternately eccentric with respect to each other, that is, they are arranged in two groups of which one protrudes to the right and the other to the left. The shaft 55 is mounted in horizontal bearings 57 united by the bridge 65 having short pillars 58, which latter are screwed or otherwise secured on to the platform 3 on which the tennis racket is fixed.

The shaft 55 may be rotated in the bearing 57, preferably though not exclusively so, by hand through the medium of a handle 59 arranged thereon. In order to enable the discs 56 to come into operation at various places in the longitudinal direction of the racket, the pillars 58 are made adjustable in the said direction by arranging for them to pass through the longitudinal slots 60 in the platform 3 and slide along therein.

In order to provide greater access to the top of the racket, particularly when the last pair of strings are being threaded, the shaft 55 together with its eccentric discs 56 may be made to swing as a whole about a fulcrum 61.

While we do not confine ourselves in the use of this invention for tensioning the cross strings only, it is preferable however to string the longitudinal strings by hand.

There is a further optional modification in connection with the main portion of the invention, that is the differential gear. In an optional arrangement according to Figs. 18, 18a, 18b and 19, this consists of a continuous shaft 66, a pair of bevel wheels 67, 68, of which one of them (67) is driven from the outside and runs freely on the said shaft 66 and the other one 68 is keyed to the shaft 66, and further of a pair, or preferably of a single planet bevel wheel 69 which meshes with the said main bevel wheels 67, 68. The planet wheel 69 is borne by a pivot pin 69a carried by a ring 70, and the latter runs concentrically on the shaft 66 with the aid of a suitable cage or housing 71.

In this modified example, the cage or housing 71 is held back to a certain extent by means of a counterweight 72, Figs. 5 and 6, on a lever 73 attached to the cage and is thus oppositely loaded just like the counter-tensioning shaft 14 in the first example. The actual string device in the optional example according to Figs. 4 to 6 and 18 and 19, is driven by a continuous shaft 66 which in this case carries a sprocket wheel 74 which may be coupled with it through a clutch 76.

The remaining parts of the arrangement are modified as follows:

The automatic clutch control with a modified differential operates in a manner quite similar to that described in connection with Fig. 8. The clutch 76 may be engaged by operating the foot lever 84. Through the connection shown in Fig. 18a, the clutch 76 may thus be engaged manually with the clutch teeth on sprocket 74. The differential housing carries an extension arm 73 on which the weight 72 is adjustably mounted. This arm 73 is adapted to strike the tail 73a of the spring pressed latch member 73b, which coacts with a roller 73c carried on the free end of an arm 73d, which forms part of the clutch actuating fork 73e. Pressure on the clutch pedal 84 will, through the link 84a and lever connections shown in Fig. 18a, engage the clutch 76 with the teeth on a sprocket gear 74, whereupon the spring latch 73b will hold the clutch parts in engagement until the extension arm 73 of the differential housing strikes the tail 73a and trips the latch, thus permitting the spring 78a to move the fork 73e to position to disengage the clutch.

The operation of this modified form of the differential gear is as follows:—

Figure 18:
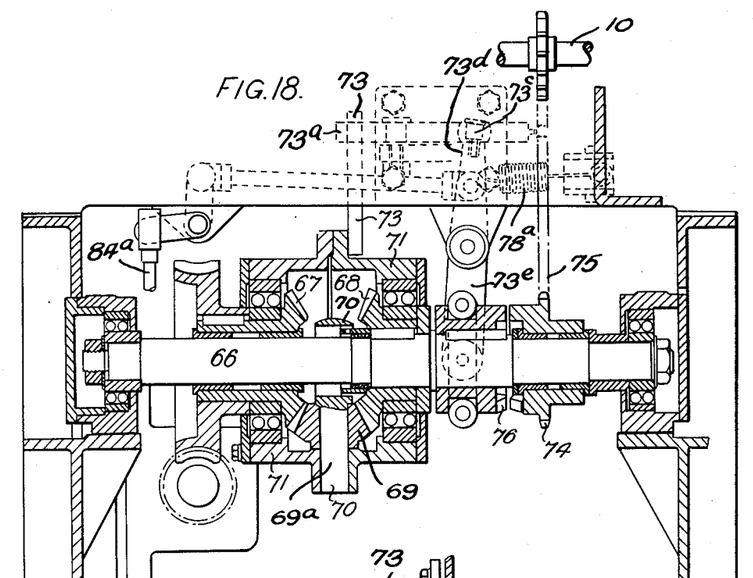
Fig. 18 shows a vertical longitudinal section of a modified form of differential gear.
Figure 18A:
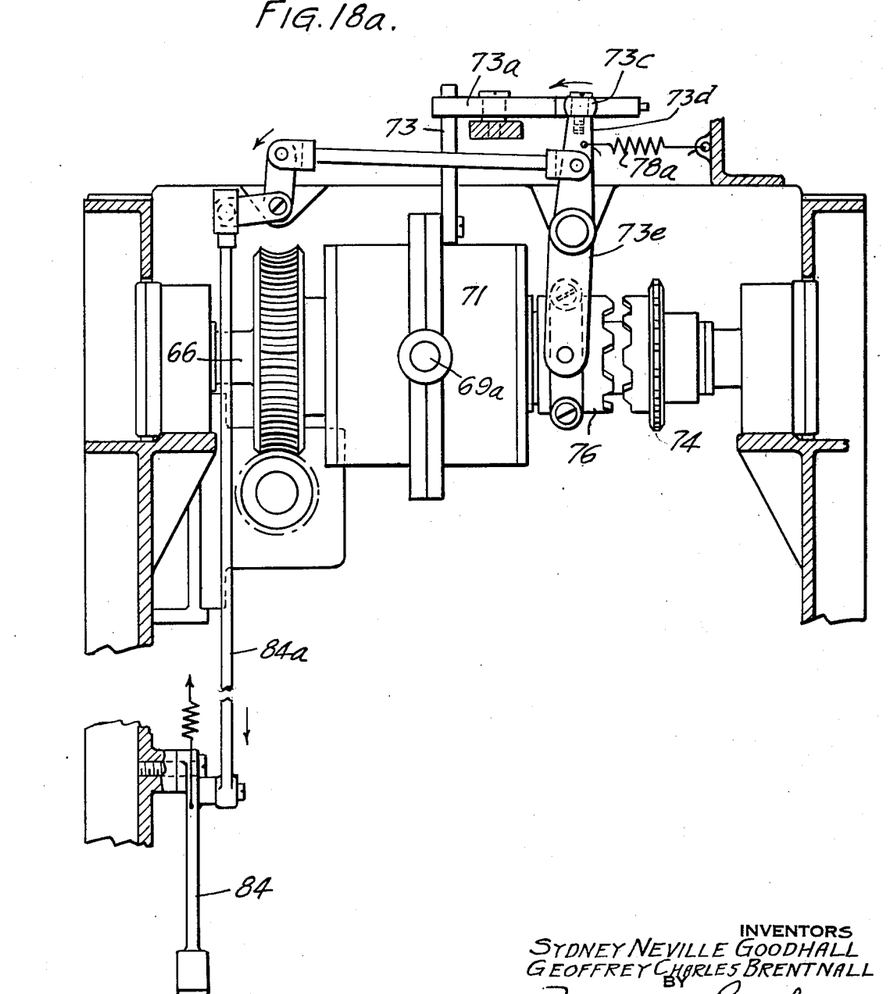
Fig. 18a is a side elevation thereof showing related clutch control mechanism.
Figure 18B:
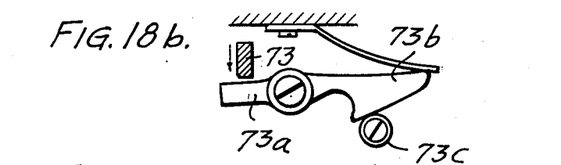
Fig. 18b is a detail of a clutch control latch shown.
Figure 19:
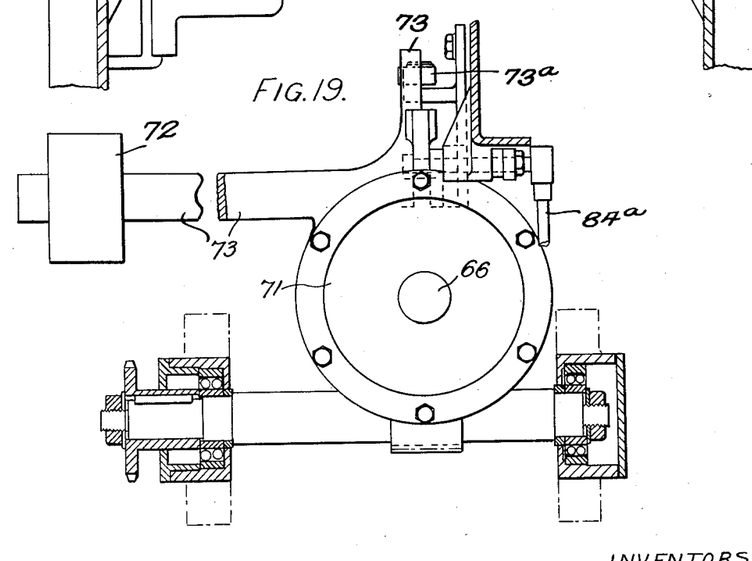

The main bevel wheel 67, Fig. 18, loosely rotating on the shaft 66 is continuously set into rotation from outside by the associated gear and the cage 71 being restrained by the weight 72, the bevel wheel 67 causes the planet wheel 69 to rotate about its pivots so that the bevel wheel 68 and the shaft 66 on to which it is keyed must also rotate. The string is now clamped in the string grip 6 and the coupling is engaged so that the intermediate shaft 10 and consequently also the respective gripper shafts 1, 2, are rotated. As soon as the tension in the string is built up and the lever 73 has reached a predetermined position in which it engages means to release the clutch 76, as spring 78a operates in a similar manner to the spring 78 and performs its normal function of disengaging the clutch; it being understood that the pedal 84 and linkage 84a is effective to engage the clutch when it is desired to impart rotation to the shaft 66.

What we claim is:

1. Apparatus for stringing rackets comprising means for drawing strings through the racket under tension, and automatic means for stopping said drawing means and holding said string under tension when the tension on said string reaches a predetermined value.

2. Apparatus for stringing rackets which comprises means for holding a racket, means for securing a string and drawing to a definite tension, and automatic means for stopping said drawing means when a predetermined tension is reached.

3. Apparatus for stringing rackets which comprises means for holding a racket, means for securing and drawing a string, means for driving said string drawing means, and automatic means for disconnecting said string drawing means from said driving means when said string drawing means reaches a predetermined tension.

4. Apparatus for stringing rackets which comprises means for holding a racket, means for securing and drawing a string through said racket, a differential gear having a driving gear, a driven gear connected to drive said string drawing means, a restrained gear held from rotation by a known force, and means actuated by the movement of said restrained gear against said known force to disconnect said driving gear from said drawing means.

5. Apparatus for stringing rackets which comprises means for holding a racket, means for securing and drawing a string through said racket, a differential gear having a driving gear, a driven gear connected to drive said string drawing means, a restrained gear held from rotation by a known force, means actuated by the movement of said restrained gear against said known force to disconnect said driving gear from said drawing means, and means for securing said string under tension when said driving gear is disconnected from said drawing means.

6. Apparatus for stringing rackets which comprises means for holding the rackets, string securing and drawing means, a differential gear comprising a driven planetary gear, a restrained main gear and a driven main gear having a driving connection to said string drawing means, means for restraining said restrained gear from rotation under a predetermined force, and means actuated by the rotation of said restrained gear against said force to disconnect said driven gear from said string drawing means.

7. A racket stringing apparatus which comprises means for holding the racket string drawing means, means for driving said string drawing means comprising differential gears having a driven main gear connected to said string drawing means, a driving main gear, a planetary gear restrained from rotation about the axis of said main gear under a predetermined force, and means actuated by the movement of said planetary gear against said force to disconnect said driven gear from said string drawing apparatus.

8. Apparatus for stringing rackets which comprises means for holding a racket, a pair of string drawing means one on each side of said racket holding means, driving means for said string drawing means, and automatic means to release said string drawing means from said driving means when a predetermined tension is reached.

9. Apparatus for stringing rackets which comprises means for holding a racket, means for securing and drawing a string, said means comprising a pair of segments having inter-fitting surfaces to receive a string, and means for clamping said surfaces toward each other, means for rotating said string clamping and drawing means, and automatic means for stopping said rotation when a definite tension is attained on said string.

10. Apparatus for stringing rackets which comprises means for holding a racket, means for drawing a string through said racket, automatic means for releasing said drawing means when a definite tension has been attained, and means for clamping a tensioned string in said racket when said drawing means is released.

11. The apparatus of claim 10 in which said tension retaining means comprises a clamp operable to clamp said strings from opposite sides of a racket.

12. Apparatus for stringing rackets which comprises means for securing a racket and for securing an end of a string therein, string drawing means to draw the opposite end of said string through said racket, means to detachably secure said string to said drawing means, said drawing means comprising a rotary shaft and a driving means therefor, automatic means to disconnect said driving means from said shaft when a predetermined tension is imposed on said string drawing means, and means to prevent reverse rotation of said string drawing shaft on the stoppage of said driving means.

SYDNEY NEVILLE GOODHALL.
GEOFFREY CHARLES BRENTNALL.